(12) United States Patent
Berliner et al.

(10) Patent No.: US 9,152,234 B2
(45) Date of Patent: Oct. 6, 2015

(54) DETECTING USER INTENT TO REMOVE A PLUGGABLE PERIPHERAL DEVICE

(71) Applicant: PrimeSense Ltd., Tel Aviv (IL)

(72) Inventors: Tamir Berliner, Beit Hashmonay (IL); Jonathan Pokrass, Bat-Yam (IL)

(73) Assignee: APPLE INC., Cupertino, CA (US)

( * ) Notice: Subject to any disclaimer, the term of this patent is extended or adjusted under 35 U.S.C. 154(b) by 67 days.

(21) Appl. No.: 14/093,474

(22) Filed: Dec. 1, 2013

(65) Prior Publication Data
US 2014/0152552 A1    Jun. 5, 2014

Related U.S. Application Data

(60) Provisional application No. 61/732,354, filed on Dec. 2, 2012.

(51) Int. Cl.
| | |
|---|---|
| *G06F 3/033* | (2013.01) |
| *G06F 3/01* | (2006.01) |
| *G06F 3/041* | (2006.01) |
| *G06F 1/16* | (2006.01) |

(52) U.S. Cl.
CPC .............. *G06F 3/017* (2013.01); *G06F 1/1626* (2013.01); *G06F 1/1632* (2013.01); *G06F 1/1686* (2013.01); *G06F 3/041* (2013.01)

(58) Field of Classification Search
CPC ........... G06F 3/017; G06F 3/01; G06F 3/005; G06F 3/041; G06F 3/044
USPC .............. 345/156–178; 178/18.01–18.09, 178/20.01–20.04
See application file for complete search history.

(56) References Cited

U.S. PATENT DOCUMENTS

| | | | |
|---|---|---|---|
| 6,937,468 B2 * | 8/2005 | Lin et al. ................. | 361/679.41 |
| 7,348,693 B2 | 3/2008 | Sasaki et al. | |
| 8,166,421 B2 * | 4/2012 | Magal et al. ................. | 715/863 |
| 8,456,517 B2 * | 6/2013 | Spektor et al. ................. | 348/43 |
| 8,498,100 B1 * | 7/2013 | Whitt et al. ............. | 361/679.17 |
| 8,872,762 B2 * | 10/2014 | Galor et al. .................... | 345/156 |
| 8,933,876 B2 * | 1/2015 | Galor et al. .................... | 345/156 |
| 2005/0031166 A1 * | 2/2005 | Fujimura et al. ............. | 382/103 |
| 2009/0228841 A1 * | 9/2009 | Hildreth ....................... | 715/863 |
| 2010/0007717 A1 | 1/2010 | Spektor et al. | |
| 2011/0052006 A1 | 3/2011 | Gurman et al. | |
| 2011/0293137 A1 | 12/2011 | Gurman et al. | |
| 2013/0170126 A1 * | 7/2013 | Lee .......................... | 361/679.17 |
| 2014/0169853 A1 * | 6/2014 | Sharma et al. ............... | 400/481 |
| 2014/0184904 A1 * | 7/2014 | Lam et al. ..................... | 348/375 |

FOREIGN PATENT DOCUMENTS

| | | |
|---|---|---|
| WO | 03071410 A2 | 8/2003 |
| WO | 2007043036 A1 | 4/2007 |
| WO | 2007105205 A2 | 9/2007 |
| WO | 2008120217 A2 | 10/2008 |
| WO | 2012020380 A1 | 2/2012 |

* cited by examiner

*Primary Examiner* — Vijay Shankar
(74) *Attorney, Agent, or Firm* — D. Kligler I.P. Services Ltd.

(57) ABSTRACT

A method includes receiving, from a three-dimensional (3D) sensing device coupled to a computer, a sequence of 3D maps including at least part of a hand of a user positioned in proximity to the computer. In embodiments of the present invention, the computer is coupled to one or more peripheral devices, and upon identifying, in the sequence of 3D maps, a movement of the hand toward a given peripheral device, an action preparatory to disengaging the given peripheral device is initiated.

19 Claims, 6 Drawing Sheets

DETECTING USER INTENT TO REMOVE A PLUGGABLE PERIPHERAL DEVICE

CROSS-REFERENCE TO RELATED APPLICATION

This application claims the benefit of U.S. Provisional Patent Application 61/732,354, filed Dec. 2, 2012, which is incorporated herein by reference.

FIELD OF THE INVENTION

This invention relates generally to user interfaces for computerized systems, and specifically to user interfaces that are based on three-dimensional sensing.

BACKGROUND OF THE INVENTION

Computer interfaces based on three-dimensional (3D) sensing of parts of the user's body are known in the art. For example, PCT International Publication WO 03/071410, whose disclosure is incorporated herein by reference, describes a gesture recognition system using depth-perceptive sensors. A 3D sensor provides position information, which is used to identify gestures created by a body part of interest. The gestures are recognized based on a shape of a body part and its position and orientation over an interval. The gesture is classified for determining an input into a related electronic device.

As another example, U.S. Pat. No. 7,348,963, whose disclosure is incorporated herein by reference, describes an interactive video display system, in which a display screen displays a visual image, and a camera captures 3D information regarding an object in an interactive area located in front of the display screen. A computer system directs the display screen to change the visual image in response to changes in the object.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method including receiving, from a three dimensional (3D) sensing device coupled to a computer, a sequence of 3D maps including at least part of a hand of a user positioned in proximity to the computer, the computer coupled to one or more peripheral devices, and upon identifying, in the sequence of 3D maps, a movement of the hand toward a given peripheral device, initiating an action preparatory to disengaging the given peripheral device.

There is also provided, in accordance with an embodiment of the present invention, an apparatus including a three-dimensional (3D) sensing device, one or more peripheral devices, and a computer coupled to the 3D sensing device and the one or more peripheral devices, and configured to receive, from the 3D sensing device, a sequence of 3D maps including at least part of a hand of a user positioned in proximity to the computer, and upon identifying, in the sequence of 3D maps, a movement of the hand toward a given peripheral device, to initiate an action preparatory to disengaging the given peripheral device.

There is further provided, in accordance with an embodiment of the present invention, computer software product including a non-transitory computer-readable medium, in which program instructions are stored, which instructions, when read by a computer executing a user interface, cause the computer to receive, from a three dimensional (3D) sensing device coupled to the computer, a sequence of 3D maps including at least part of a hand of a user positioned in proximity to the computer, the computer coupled to one or more peripheral devices, and upon identifying, in the sequence of 3D maps, a movement of the hand toward a given peripheral device, to initiate an action preparatory to disengaging the given peripheral device.

BRIEF DESCRIPTION OF THE DRAWINGS

The disclosure is herein described, by way of example only, with reference to the accompanying drawings, wherein.

DETAILED DESCRIPTION OF EMBODIMENTS

Many computing devices and software operating systems accept hot-pluggable accessories (i.e., accessories that can be plugged in and removed while the computing device is running), but may still require a user to take some preparatory action before removing such an accessory. For example, the Microsoft® Windows® operating system includes an on-screen icon to "Safely Remove Hardware and Eject Media," which the user should select before removing a device such as a Universal Serial Bus (USB) flash drive. As another example, the ASUS® Transformer comprises a tablet computer with a docking keyboard that requires the user to release a mechanical latch before removing the tablet from the docking keyboard.

Embodiments of the present invention provide methods and systems for relieving the user of the need for such preparatory actions by automatically detecting the user's intent to disengage a peripheral device. In some embodiments, a computer system is coupled to a depth-sensing camera (also referred to as a 3D sensing device) and to one or more peripheral devices, such as a docking keyboard or a USB flash drive. Upon receiving a signal from the depth-sensing camera indicating a movement of the user's hand toward a given peripheral device, the computer can initiate an action preparatory to disengaging the given peripheral device. The term "disengage," in the context of the present description and in the claims, means that the device itself or a medium accessed by the computer through the device is physically separated from the computer.

In some embodiments, the action comprises a hardware operation. For example, the computer system may comprise a tablet computer, and the given peripheral device may comprise a docking keyboard that uses a mechanical latch to hold the tablet computer in place. The hardware operation in this embodiment may comprise releasing the mechanical latch upon detecting a hand movement toward the side of the tablet computer, thereby enabling the user to easily detach the tablet computer from the docking keyboard.

Alternatively or additionally, the action may comprise a software operation. For example, the peripheral device may comprise a flash memory storage device (also referred to herein as a flash drive) that is inserted into a USB port of the computer system. The software operation in this case may comprise completing any pending data write operations to the flash drive upon detecting movement of the user's hand toward the flash drive, thereby enabling the user to safely remove the flash drive from the USB port.

SYSTEM DESCRIPTION

Figure 1:
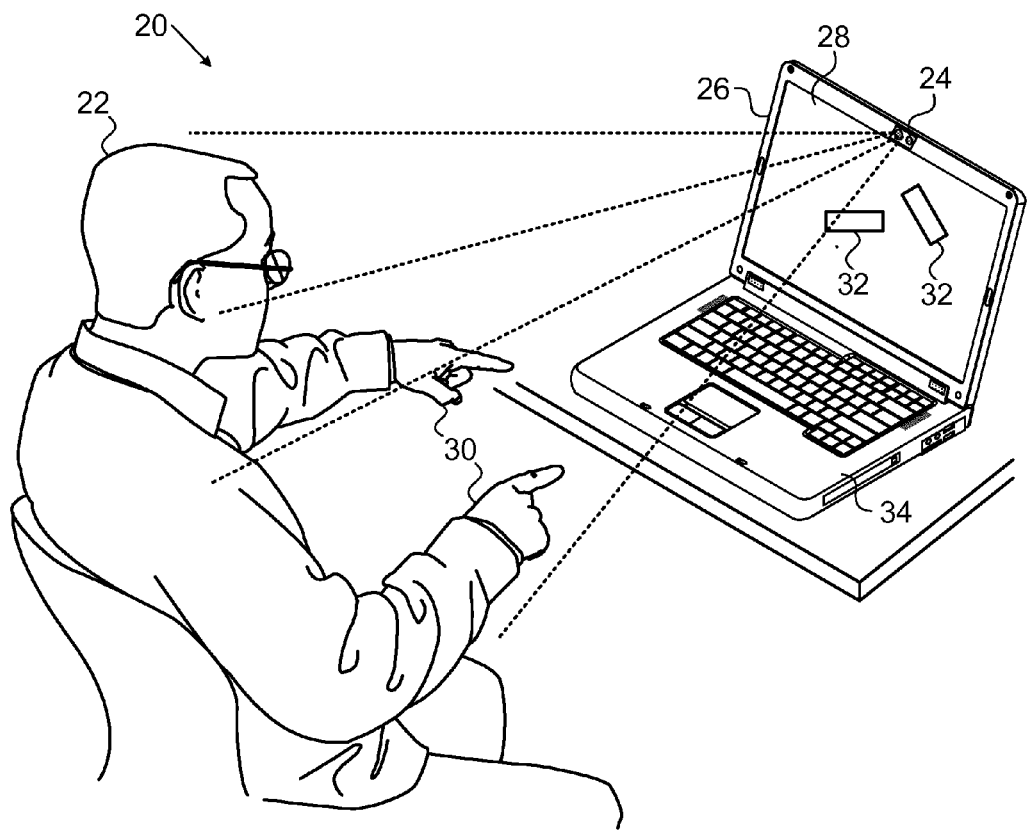
FIG. 1 is a schematic, pictorial illustration of a tablet computer implementing a non-tactile three-dimensional user interface, in accordance with an embodiment of the present invention.

FIG. 1 is a schematic, pictorial illustration of a non-tactile user interface 20 for operation by a user 22 of a tablet computer 26 (also referred to herein as computer 26), in accordance with an embodiment of the present invention. The non-tactile user interface is based on a 3D sensing device 24 coupled to the computer (and possibly integrated into the computer housing as shown in the figure), which captures 3D scene information of a scene that includes the body (or at least a body part, such as one or more of hands 30) of the user. Device 24 or a separate camera (not shown in the figures) may also capture video images of the scene. The information captured by device 24 is processed by computer 26, which drives a display 28 so as to present and manipulate on-screen interactive items 32. Details of the operation of 3D sensing device 24 are described, for example, in U.S. Patent Application Publication 2010/0007717, whose disclosure is incorporated herein by reference.

In the configuration shown in FIG. 1, tablet computer 26 is inserted into a docking station 34. While FIG. 1 shows computer 26 having a tablet form factor, other types of computer systems configured to execute non-tactile user interface 20 are considered to be within the spirit and scope of the present invention. Examples of other type of computer systems include, but are not limited to, laptop computers, desktop computers, gaming consoles and home media systems.

Sensing device 24 may comprise, for example, the Kinect™ device used in the Microsoft Xbox™ or the PS1080™ system produced by PrimeSense Ltd. (Tel Aviv, Israel). It is desirable that 3D sensing device 24 have a wide field of view, reaching as close as possible to ±90°, at least in the horizontal direction. For this purpose, an adaptive scanning type 3D sensing device 24 may be desirable, such as the type of devices described, for example, in PCT International Publication WO 2012/020380, whose disclosure is incorporated herein by reference. Alternatively, any other suitable type of 3D sensor that is known in the art may be used for the present purposes, such as a wide-angle sensor based on stereoscopic imaging.

Computer 26 processes data generated by device 24 in order to reconstruct a 3D map of user 22. The term "3D map" refers to a representation of a scene as a two-dimensional matrix of pixels, in which each pixel corresponds to a respective location in the scene and has a respective pixel depth value, indicative of the distance from a certain reference location to the respective scene location.

In one embodiment, device 24 projects a pattern of spots onto the object and captures an image of the projected pattern. Computer 26 then computes the 3D coordinates of points on the surface of the user's body by triangulation, based on transverse shifts of the spots in the pattern. Methods and devices for this sort of triangulation-based 3D mapping using a projected pattern are described, for example, in PCT International Publications WO 2007/043036, WO 2007/105205 and WO 2008/120217, whose disclosures are incorporated herein by reference. In further embodiments, non-tactile user interface 20 may use other methods of 3D mapping, using single or multiple cameras or other types of sensors, as are known in the art.

Typically, computer 26 receives a sequence of 3D maps from 3D sensing device 24, and process the 3D maps to identify hands 30 and thus to detect gestures made by user 22. Methods that can be used for this purpose are described, for example, in U.S. Patent Application Publications 2011/0293137 and 2011/0052006, whose disclosures are incorporated herein by reference.

Alternatively, any other suitable methods of image analysis and gesture detection that are known in the art may be used to detect the user gestures. For the most part, these gestures are directed at interactive items 32 presented by computer 26 on display 28. For example, the user may point toward a given interactive item 32 to select it, or may make other suitable gestures to move the interactive items on the display or to pan and/or zoom the display.

Computer 26 typically comprises a general-purpose computer processor, which is programmed in software to carry out the functions described hereinbelow. The software may be downloaded to the processor in electronic form, over a network, for example, or it may alternatively be provided on non-transitory tangible media, such as optical, magnetic, or electronic memory media. Alternatively or additionally, some or all of the functions of the processor may be implemented in dedicated hardware, such as a custom or semi-custom integrated circuit or a programmable digital signal processor (DSP).

PERIPHERAL DEVICE REMOVAL

Figure 2A:
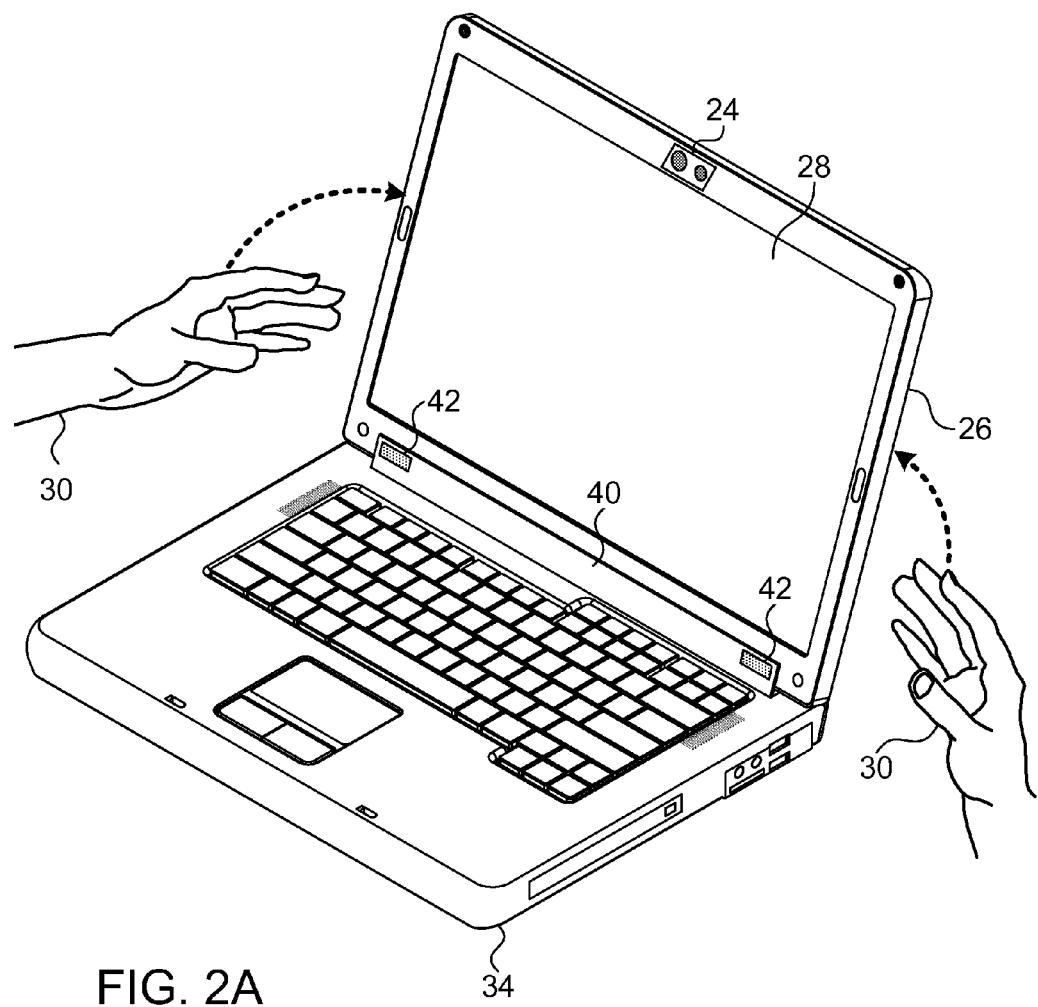
FIGS. 2A and 2B are schematic pictorial illustrations of a user removing the tablet computer from a docking station, in accordance with a first embodiment of the present invention.
Figure 2B:
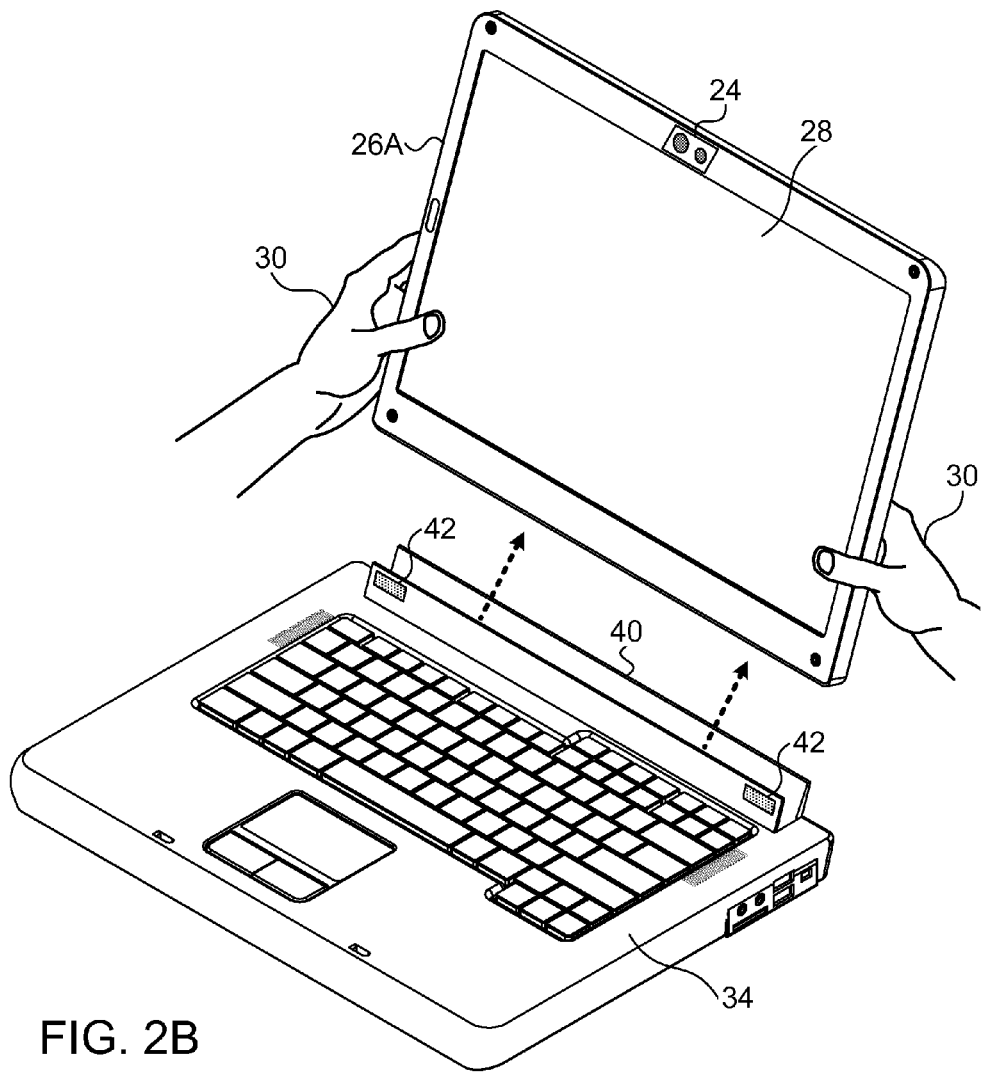

FIGS. 2A and 2B are schematic pictorial illustrations of user 22 removing tablet computer 26 from docking station 34, in accordance with a first embodiment of the present invention. Docking station 34 comprises a docking slot 40 and mechanical docking latches 42. In operation, upon user 22 inserting (also referred to herein as docking) tablet computer 26 into docking slot 40, docking latches 42 close automatically to grasp the tablet computer.

In FIG. 2A, tablet computer 26 is docked in docking station 34, and user 22 is moving hands 30 toward the sides of the tablet computer. In embodiments of the present invention, in response to detecting one or more hands 30 moving toward tablet computer 26, tablet computer 26 releases mechanical latches 42, thereby enabling user 22 to remove the tablet computer from docking station 34, as shown in FIG. 2B, without having to release the latches manually.

Figure 3:
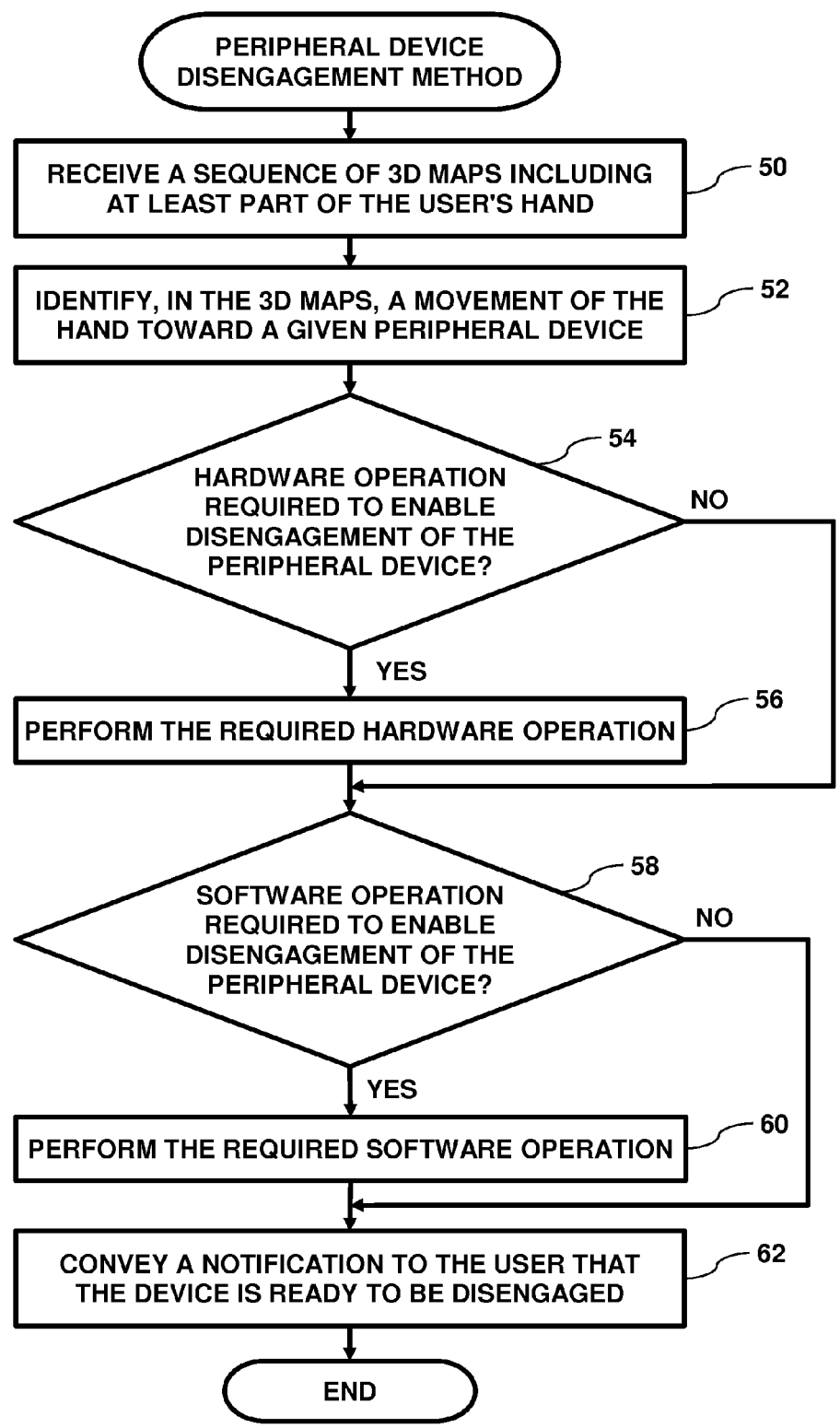
FIG. 3 is a flow diagram that schematically illustrates a method of preparing a given peripheral device for disengagement from the tablet computer, in accordance with embodiments of the present invention.

FIG. 3 is a flow diagram that schematically illustrates a method of preparing a peripheral device for disengagement from computer 26, in accordance with embodiments of the present invention. In a receive step 50, tablet computer 26 receives, from 3D sensing device 24, a sequence of 3D maps including at least part of a given hand 30 positioned in proximity to the computer, and in an identification step 52, the tablet computer identifies a movement of the hand toward a given peripheral device.

In a first comparison step 54, tablet computer 26 determines if a hardware operation is required to enable the given peripheral device to be disengaged from the tablet computer. If tablet computer 26 determines that a hardware operation is required, then the tablet computer performs the required hardware operation in a first perform step 56. Otherwise, the method proceeds to step 58, which is described below.

In the embodiment shown in FIGS. 2A and 2B, the given peripheral device comprises docking station 34. In FIG. 2A, tablet computer 26 is docked in docking station 34, and in response to the tablet computer identifying one or both hands 30 moving toward the sides of the tablet computer in step 52, the required hardware operation in step 56 comprises tablet computer 26 releasing docking latches 42 in order to enable user 22 to physically remove tablet computer 26 from the docking station. Thus, when user 22 grasps an edge of tablet computer 26 and lifts it, the tablet computer will be freed automatically from docking station 34 without requiring any other preparatory action by the user, such as pressing a "keyboard detach" button (not shown).

In some embodiments, the identified movement may not be directly toward the given peripheral device. For example, if tablet computer 26 is docked in docking station 34 and no other removable peripheral devices are coupled to the tablet computer or the docking station, then the computer can release docking latch 42 in response to detecting a movement of hand 30 toward a given side of the tablet computer or the docking station, as shown in FIGS. 2A and 2B.

Figure 4:
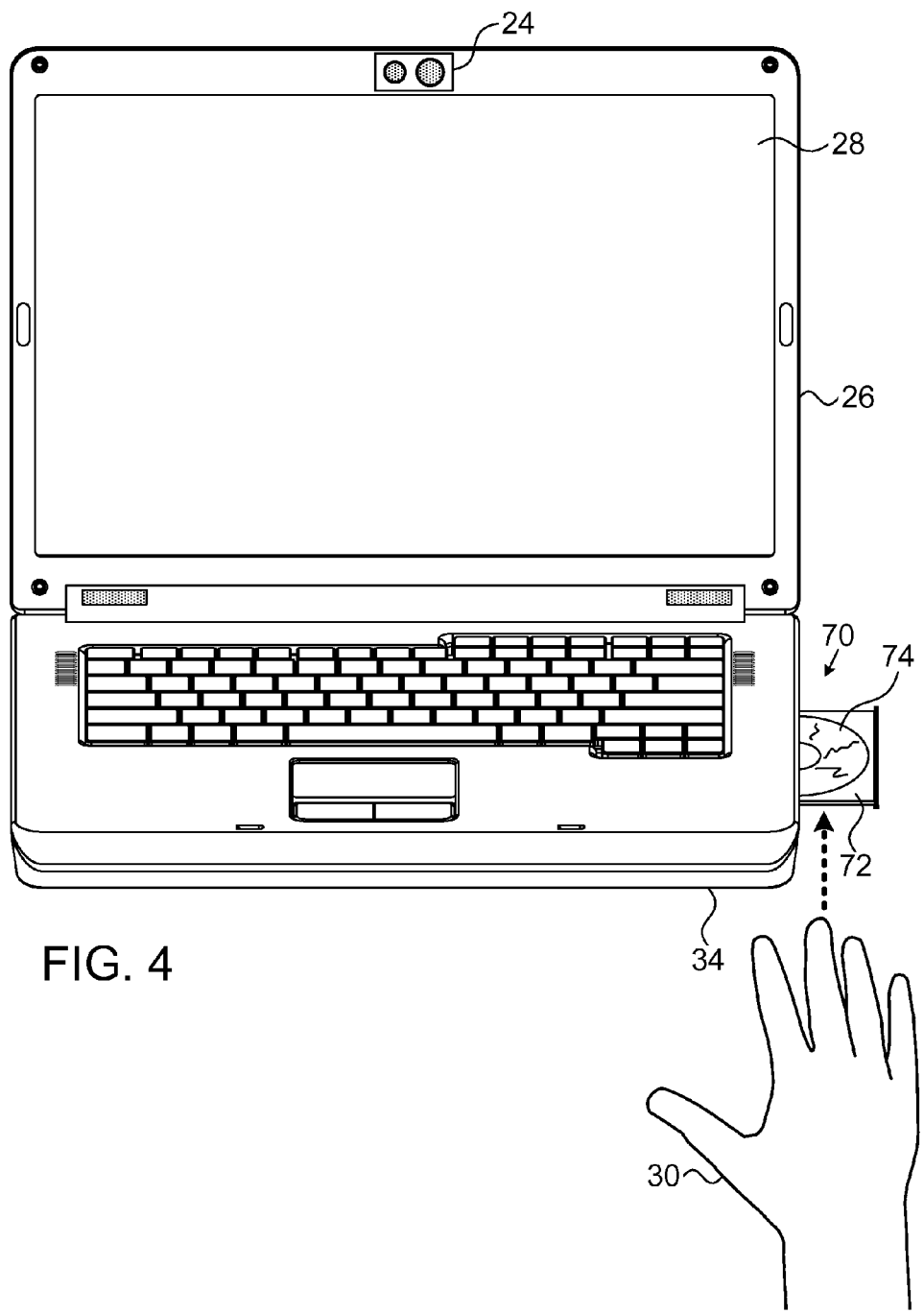
FIG. 4 is a schematic pictorial illustration of the user performing a gesture prior to removing an optical disk from an optical drive coupled to the tablet computer, in accordance with a second embodiment of the present invention.

FIG. 4 is a schematic pictorial illustration of user 22 moving hand 30 toward an optical disk drive 70 (e.g., a CD or a DVD drive), in accordance with a second embodiment of the present invention. Optical disk drive 70 comprises a mechanical drawer 72 that is configured to hold a removable optical disk 74. In response to identifying a given hand 30 moving toward the optical disk drive in step 52, the required hardware operation in step 56 comprises tablet computer 26 ejecting optical disk 74 by opening mechanical drawer 72, thereby enabling user 22 to remove the optical disk from the drawer.

While the configuration in FIG. 4 shows optical disk drive 70, any storage device with a removable storage medium that can be ejected from the storage device via a hardware operation is considered to be within the spirit and scope of the present invention. Examples of removable storage media for removable storage devices include, but are not limited to hard disk cartridges, tape cartridges and flash memory cards.

Returning to the flow diagram, in a second comparison step 58, computer 26 determines if a software operation is required to enable the given peripheral device to be disengaged from the computer. If computer 26 determines that a software operation is required, then the computer performs the required software operation in a second perform step 60.

Figure 5:
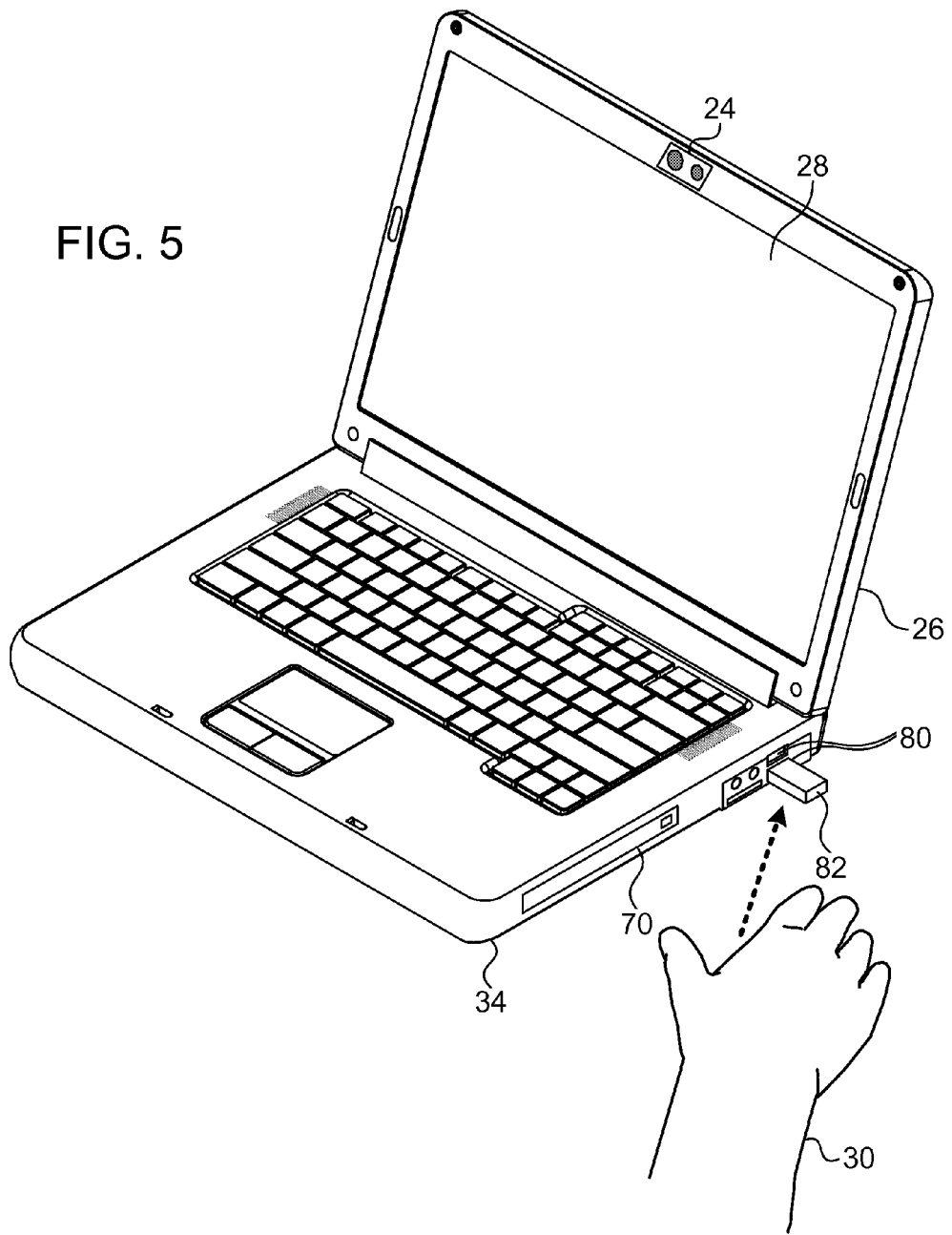
FIG. 5 is a schematic pictorial illustration of the user performing a gesture prior to removing a Universal Serial Bus flash drive coupled to the tablet computer, in accordance with a third embodiment of the present invention.

FIG. 5 is a schematic pictorial illustration of user 22 moving hand 30 toward a USB flash drive 82, in accordance with a third embodiment of the present invention. In the example shown in FIG. 5, docking station 34 comprises two USB ports 80, and USB flash drive 82 is plugged into one of the USB ports. In response to identifying a given hand 30 moving toward the USB flash drive 82 in step 52, the required software operation in step 60 comprises tablet computer 26 completing any pending write operations to the USB flash drive. In an alternative embodiment, tablet computer 26 may comprise an additional USB port (not shown), and flash drive 82 may be plugged into the additional USB port.

While the configuration in FIG. 5 shows USB flash drive 82 plugged into a given USB port 80 of docking station 34 (or tablet computer 26), any type of pluggable device coupled to tablet computer 26 is considered to be within the spirit and scope of the present invention. Examples of pluggable devices include, but are not limited to, external hard drives, digital cameras, cellular phones and media (e.g., MP3 and MP4) players.

Additionally or alternatively, the pluggable device may be coupled to tablet computer 26 via a communication protocol other than USB. Examples of other communication protocols include, but are not limited to Firewire™, External Serial Advanced Technology Attachment (sSATA), Power over eSATA (eSATAp) and wireless connections such as Bluetooth™.

Finally, in a notification step 62, upon completing and hardware and/or software operations required to enable disengagement of the given peripheral device, computer 26 conveys a notification to user 22 indicating that the given peripheral device is ready to be disengaged, and the method ends. In some embodiments, the notification may comprise a visual notification (e.g., a text message and/or a graphical icon) presented on the tablet computer's display. For example, tablet computer 26 can present the message "Safe to Remove Hardware" (or a specific icon) on display 28. In alternative embodiments, the notification may comprise tablet computer 26 generating an audio output (e.g., one or more beeping sounds).

Returning to step 58, if computer 26 determines that the given peripheral device does not require a software operation to enable the given peripheral device to be disengaged from the computer, then the method continues with step 62.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An apparatus, comprising:
a three-dimensional (3D) sensing device;
one or more peripheral devices; and
a computer coupled to the 3D sensing device and the one or more peripheral devices, and configured:
to receive, from the 3D sensing device, a sequence of 3D maps including at least part of a hand of a user positioned in proximity to the computer, and
upon identifying, in the sequence of 3D maps, a movement of the hand toward a given peripheral device, to initiate an action preparatory to disengaging the given peripheral device.

2. The apparatus according to claim 1, wherein the computer is configured to convey a notification to the user upon completing the action.

3. The apparatus according to claim 2, and comprising a display coupled to the computer, and wherein the computer is configured to convey the notification by presenting a visual notification on the display.

4. The apparatus according to claim 2, wherein the computer is configured to convey the notification by generating an audio output.

5. The apparatus according to claim 1, wherein the action comprises a hardware operation.

6. The apparatus according to claim 5, wherein the computer comprises a tablet computer, and wherein the given peripheral device comprises a docking station configured to hold the tablet computer via a docking latch, and wherein the hardware operation comprises opening the docking latch.

7. The apparatus according to claim 5, wherein the given peripheral device comprises a storage device having a removable storage medium, and wherein the hardware operation comprises ejecting the removable storage medium.

8. The apparatus according to claim 1, wherein the action comprises a software operation.

9. The apparatus according to claim 8, wherein the given peripheral device comprises a pluggable storage device, and wherein the software operation comprises completing a data write operation to the storage device.

10. A computer software product comprising a non-transitory computer-readable medium, in which program instructions are stored, which instructions, when read by a computer executing a user interface, cause the computer:

to receive, from a three-dimensional (3D) sensing device coupled to the computer, a sequence of 3D maps including at least part of a hand of a user positioned in proximity to the computer, the computer coupled to one or more peripheral devices; and upon identifying, in the sequence of 3D maps, a movement of the hand toward a given peripheral device, to initiate an action preparatory to disengaging the given peripheral device.

11. A method, comprising:

receiving, from a three-dimensional (3D) sensing device coupled to a computer, a sequence of 3D maps including at least part of a hand of a user positioned in proximity to the computer, the computer coupled to one or more peripheral devices; and upon identifying, in the sequence of 3D maps, a movement of the hand toward a given peripheral device, initiating an action preparatory to disengaging the given peripheral device.

12. The method according to claim 11, and comprising conveying a notification to the user upon completing the action.

13. The method according to claim 12, wherein conveying the notification comprises presenting a visual notification on a display.

14. The method according to claim 12, wherein conveying the notification comprises generating an audio output.

15. The method according to claim 11, wherein the action comprises a hardware operation.

16. The method according to claim 15, wherein the computer comprises a tablet computer, and wherein the given peripheral device comprises a docking station configured to hold the tablet computer via a docking latch, and wherein the hardware operation comprises releasing the docking latch.

17. The method according to claim 5, wherein the given peripheral device comprises a storage device having a removable storage medium, and wherein the hardware operation comprises ejecting the removable storage medium.

18. The method according to claim 11, wherein the action comprises a software operation.

19. The method according to claim 18, wherein the peripheral device comprises a pluggable storage device, and wherein the software operation comprises completing a data write operation to the storage device.

* * * * *